C. H. KENNEY.
MARINE SPEEDOMETER.
APPLICATION FILED MAY 9, 1913.
1,138,226.
Patented May 4, 1915.
2 SHEETS—SHEET 1.
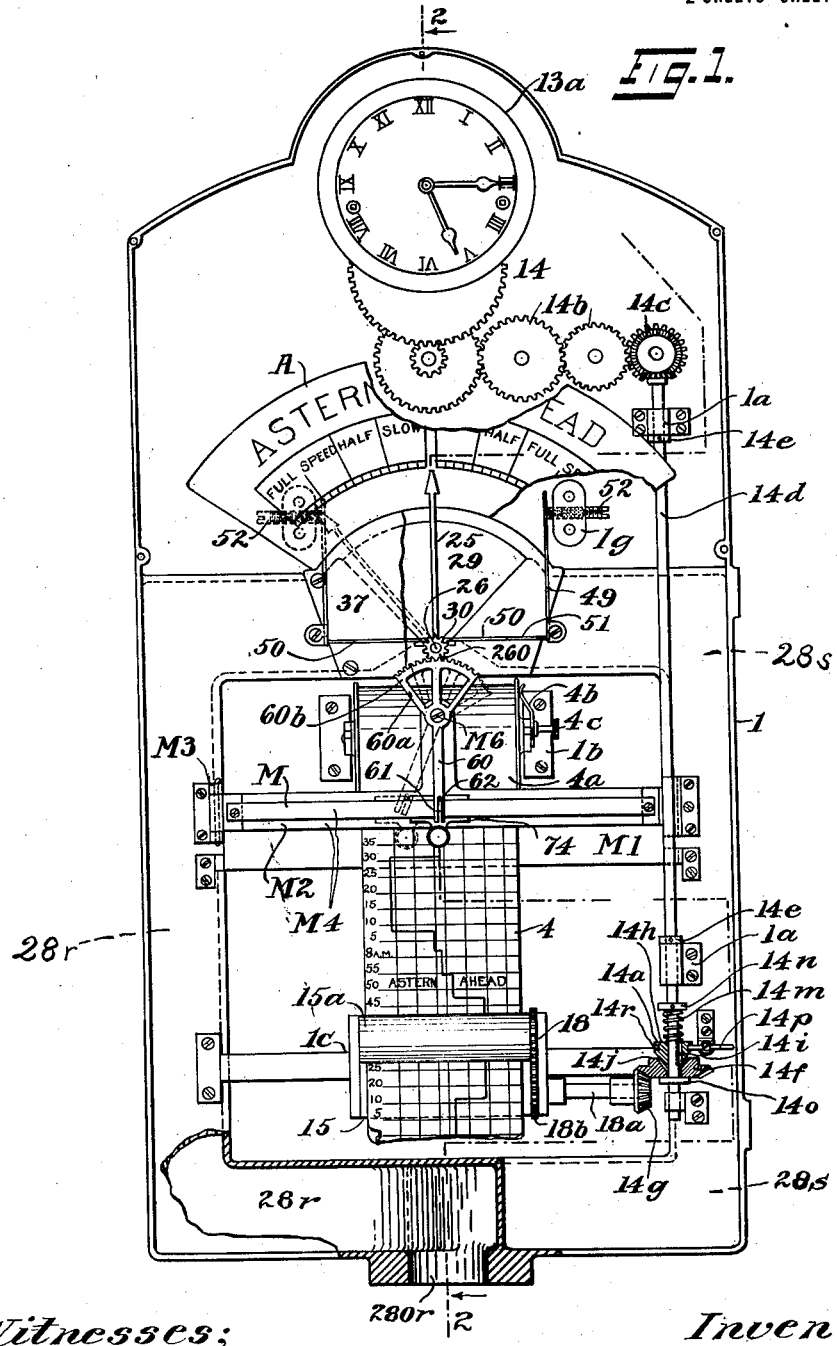
Witnesses:
Louis O. Badeau.
Chas. E. Whiteman
Inventor:
Charles H. Kenney.
By his Attorney, T. H. Richards

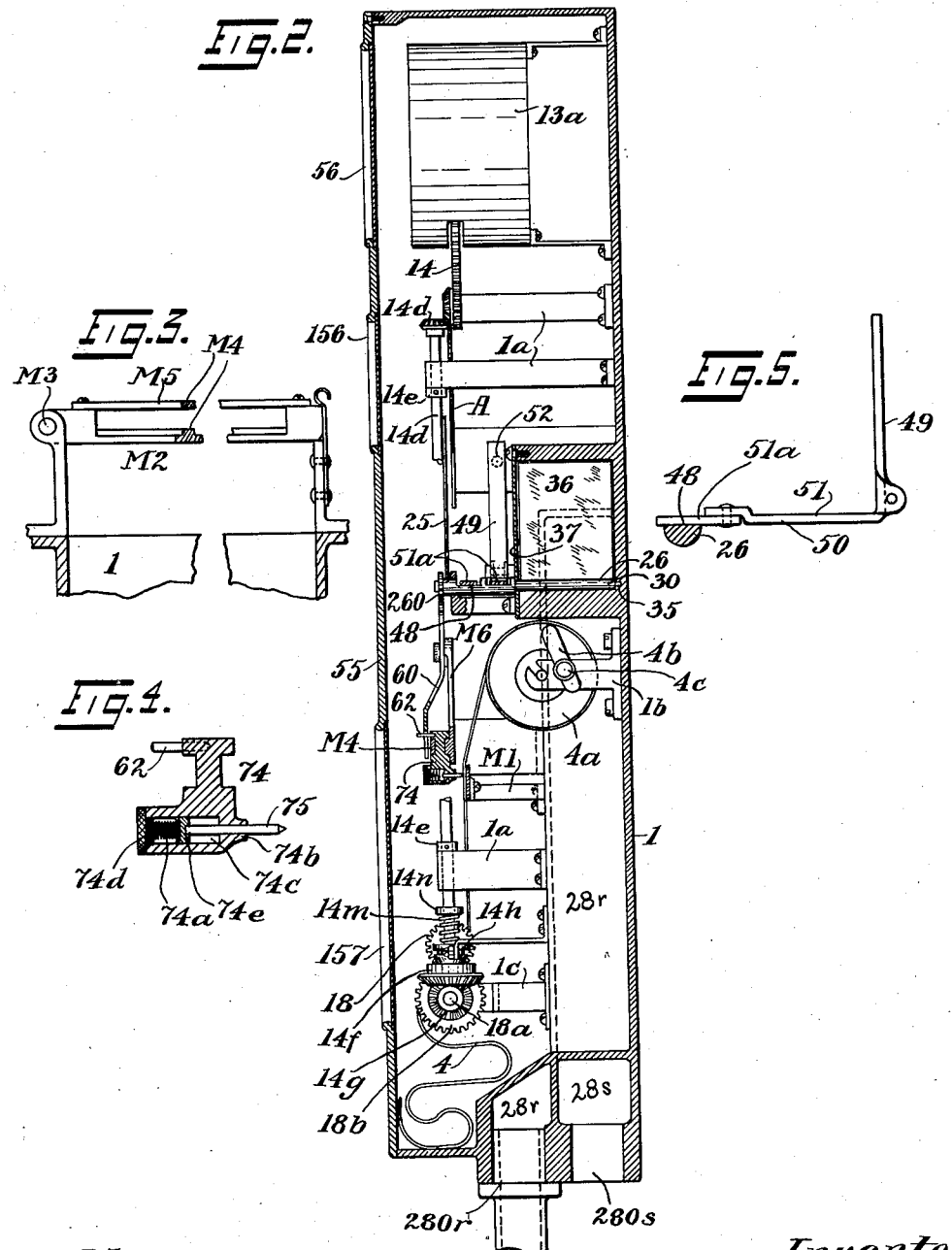

UNITED STATES PATENT OFFICE.

CHARLES H. KENNEY, OF NEW LONDON, CONNECTICUT.

MARINE SPEEDOMETER.

1,138,226.     Specification of Letters Patent.     Patented May 4, 1915.

Application filed May 9, 1913. Serial No. 766,490.

*To all whom it may concern:*

Be it known that I, CHARLES H. KENNEY, a citizen of the United States, residing in New London, in the county of New London and State of Connecticut, have invented certain new and useful Improvements in Marine Speedometers, of which the following is a specification.

My present invention relates to marine speedometers or automatic recording logs for vessels, adapted to continuously indicate and record the ship's general direction (ahead or astern) and approximate speed, and consists in certain improvements, as hereinafter described, upon the apparatus illustrated and described in my pending application, Serial No. 634,881, said improvement being designed to make such apparatus more generally and readily applicable to different locations upon vessels of varying types, and more accurate and reliable in practical operation.

As in the application referred to, I provide, on a vessel, a suitable exhauster-blower or reversible air pump connected with the engine or a propeller or wheel-shaft, a glazed case, an air pipe connecting said air pump with said case, a vane or blade operable by air pressure or suction induced by said pump, a pointer or needle connected with said blade, a dial by which to read locations of said pointer, a clock and a tape-record mechanism operably connected with said clock and blade or vane.

The entire apparatus constitutes an automatic reading and recording log, which, by means of the location or dip of the pointer (and the reading thereof on the dial), reads at a glance whether the ship's engines are at rest, moving normally, or reversed, and the engine-speed; and which continuously draws on the tape a time, speed and direction diagram which records all starts and stops and reversals of the engines and the time thereof, their approximate speed and the periods during which such speeds were maintained.

The case containing the dial and tape-record mechanism may be located in any part of the vessel. I may locate a plurality of similar cases in various parts of the vessel and connect all of them with one air pump and pipe-system. The novel features embodied in this application are generally as follows:

(*a*) I make the dials and tapes right hand and left hand, bifurcate the air ducts in the case and provide right-hand and left-hand pipe connections on the case, so that by using the proper dial and tape and properly connecting the air pipe to the case, it can be hung to face either to port or to starboard and always have "Ahead" on the dial read toward the bow and "Astern" toward the stern of the vessel. These characteristics render my log much more generally applicable and useful. Many ships have a plurality of propeller shafts; and such shafts are generally disposed and oppositely rotated, in pairs. My present apparatus can be connected with any such shaft without regard to which way it turns, and the cases can be located at will, provided only that the air pipe be connected with each case by the proper inlet, and the proper kind of dials and tapes be used (right or left hand). It will be seen that my improvements enable me to standardize my apparatus and make one general type and pattern, adaptable to all conditions and locations, the only differences being that some will require right-hand and some left-hand dials and tapes, and some will be connected with the air by the left and some by the right hand pipe connection. Moreover, these qualities enable me to locate cases close to the steering wheels; because bridges and pilot-houses of vessels should not be illuminated at night, and when so hung my log requires the minimum illumination, merely enough to enable the steersman or officer in charge to perceive the general location and direction or dip of the pointer. In fact, the ideal conditions of night use in such places are that the case and dial be practically invisible and the pointer barely visible, indicating, by its verticality or dip toward bow or stern, whether the engines are at rest, going ahead or reversed, and by the degree of dip their approximate speed; which an experienced man can read practically as well without as with a dial. It is obvious that the desired illumination of the pointer can be obtained without rendering the dial and other parts visible, by a suitably arranged lamp and reflector, or by suitably painting the pointer, as with a luminous paint.

(*b*) My improvements enable me to hermetically seal the case and keep dirt and damp out of it and away from the indicator and record mechanism, and thus make the log more delicate and precise and at the same time more durable and reliable in its operations.

(c) I provide independent and independently adjustable spring gages or resistances for "Ahead" and "Astern" motions of the mechanism. Numerous types of ship engines, especially turbines and explosion engines, function in one mode when going ahead and in an entirely different mode when reversed; and my improved construction enables me to so adjust my apparatus to such engine-modes as to give my log the greatest possible range and convenience in use.

(d) I have greatly improved the modes of mounting, inserting and removing, and driving the tape and the mode of operating the tracing point or pencil.

(e) I make it more convenient for use by adding a clock dial.

In the drawings, Figure 1 is a front elevation with the face plate removed. Fig. 2 is a section on the line 2—2 of Fig. 1; Fig. 3 is a detail of the pencil slide-way; Fig. 4 is an enlarged detail of the pencil carriage; and, Fig. 5 is a detail of the contact plate of the spring gage.

As in the application referred to, I provide a case 1, preferably made of cast metal, a face plate 55 suitably secured (preferably screwed) thereto and making a tight joint therewith, and glazed openings 56, 156 and 157 in the face plate for reading respectively the log dial, the clock dial and the tape record. In the case 1 I core or otherwise form two air ducts $28^r$ and $28^s$, each having an exterior nipple or socket $280^r$ and $280^s$ adapted for the connection of an air pipe, by threading, or in any other convenient manner, and connecting freely at their inner ends with a cylindrical sector or curved bore 29, whose cap plate 37 is detachably secured air-tight by screws, to the walls of the air duct, whose cross-section is substantially rectangular and whose interior surfaces are suitably finished to co-act with a blade or vane 36 pivoted in the axis of the cylindrical wall, 30, of said sector, on a shaft, 26, rotatably mounted in bearings, one of which is formed in the back wall 35 of the case 1 and the other, through which said shaft extends, in the cap 37. Above and concentric with said axis, I mount a segmental, graduated and reading indicator dial A, adapted by suitable graduations, divisions and legends to be read with a needle or pointer, 25, fixed on the shaft 26 and oscillated therewith and with the vane 36 by variations in the tension of the air contained in or passing through the ducts 28 and sector 29, said tension variations being caused by the action of the aforesaid air pump connected with the engine, preferably with a propeller shaft.

In the aforesaid application I show but one such duct connected with the sector, whose opposite opening communicates freely with the interior of the case 1. In the practical use of my log I have found this construction to be open to criticism, as involving changes in more costly parts of the apparatus in order to best adapt it to its uses and also because dust and damp were brought into the case by the air and impaired the mechanism therein and its operation. I found it highly desirable that the dip of the pointer corresponding with normal engine direction and also with the location of "Ahead" on the dial and on the tape, should always be toward the bow and the opposite dip and the dial and tape-legends "Astern" should always be toward the stern, in order that readings might be taken instantaneously and always surely, with reference to the bow and stern of the ship itself and to the vertical, and in bad lights or in darkness.

I early found it highly desirable to provide left-hand and right-hand dials and tapes so that logs facing to port and to starboard respectively should both have the "Ahead" legends toward the bow and the "Astern" toward the stern; but in order to make the dips of their respective needles correspond with their legends, I found it necessary to provide two air pumps oppositely geared to the engine, two sets of air pipes, or some other costly and objectionable means of properly and similarly moving the oppositely-facing pointers. My present organization accomplishes all the desired results in a cheap and unobjectionable manner.

Having provided the two ducts $28^r$ and $28^s$ each with its nipple or socket $280^r$ and $280^s$, when the log faces ahead or port, I connect the air pipe with the left-hand duct $28^s$ and nipple $280^s$; and when it faces starboard or astern, I connect the air pipe with the right-hand duct $28^r$ and nipple $280^r$. By this organization I always locate the positive pressure side of the vane 36 toward the stern and its negative pressure or suction side toward the bow, or toward starboard and port, respectively, when the apparatus faces fore or aft.

The two air nipples, $280^r$ and $280^s$ are illustrated as one in front of the other, in the axial plane of the case 1, but obviously they could be located in any convenient place, so long as they are individual. It will be observed that the ducts and sector do not communicate with the casing, the only opening in their walls being that filled by the shaft 26. Therefore air entering one of the nipples passes through said ducts and out by the other nipple, and cannot convey dirt into the interior of the case to foul or clog the parts therein.

In the application referred to, I use an adjustable jack-knife spring arrangement to locate the pointer vertical when the engines rest and which constitutes the gage or spring-resistance to the motions of said pointer, and comprising a bell crank gage lever pivotally mounted and adjustable by means of a set screw, and having an upright and a horizontal arm, one a plate spring and one coacting with a flat surface on the shaft.

I found that when the pointer dipped toward the fulcrum of the lever 50 its gage-action was stronger than when the pointer dipped away, proportionally to the respective distances of the points of contact between the ends of the flat surface 48 from the lever pivot; and also, that for vessels installed with turbine or explosion engines (because their modes of action vary with their direction of propulsion) a single gage apparatus could not be conveniently made satisfactorily adjustable both for normal and reverse engine-rotation. I therefore provide independent gage levers, 50, independently pivotally mounted, preferably oppositely, and independently adjustable, each by a set screw 52 working in a threaded hole in a frame member $1^g$, and each comprising an upright arm 49 and a horizontal arm 51, one of said arms being a plate spring and one engaging a flat surface, 48, on the shaft 26. It is obvious that the angle included between said arms is immaterial, as is also their location relatively to one another; and that this type of gage may be replaced by any other without affecting my invention. The essential organization is, two independent spring gages connected with the vane 36 and substantially free from strain when the pointer is neutral and one of which acts and the other rests when the pointer dips positively and vice-versa when it dips negatively.

In order to make the gage action more positive and delicate, by eliminating unnecessary friction, I offset the active end of the arm 51 and rivet on a hardened and polished steel contact plate $51^a$ which bears on the flat 48. I found it desirable to provide a clock-dial so that the time, direction and approximate speed might be read by one glance at the log. I therefore raise the clock work above and adjacent to the dial and provide a clock-dial $13^a$, a corresponding glazed opening, 56, in the face plate 55, a gearing 14 connecting the clock mechanism with the tape feed gearing 18 of the tape feed roller 15, and a clutch $14^a$ by means of which the gearing may be promptly disconnected when a new tape 4 is to be inserted.

The connecting gearing comprises a gear train $14^b$ revolubly mounted on the case 1, a pair of bevel gears, $14^c$, one attached to the final gear of said train and its mate fixed on a vertical shaft, $14^d$, revolubly mounted in bearings formed in frames $1^a$ attached to the case 1 and axially confined by collars $14^e$ fixed to said shaft between and adjacent to the upper pair of said supplemental frames, and a pair of bevel gears one, $14^f$, revolubly mounted on the vertical shaft $14^d$ adjacent to its lower end and its mate $14^g$ fixed to the shaft $18^a$ of the tap feed gearing 18.

The clutch $14^a$ is a friction clutch comprising a friction cone $14^h$ on the vertical shaft $14^d$ engaging it slidably by a spline $14^i$ and adapted to engage a corresponding socket $14^j$ in the lower bevel gear $14^f$ when pressed down by a spring $14^m$ strained between said friction cone $14^h$ and a collar $14^n$ fast on the shaft $14^d$. The bevel gear $14^f$ is supported on the shaft $14^d$ by a collar $14^o$. A disengaging clutch lever $14^p$ is pivotally mounted on the frame 1 with one end engaging an annular groove $14^r$ in said friction cone, for conveniently retracting it and disengaging the clutch. The tape 4 is provided in a roll $4^a$, mounted on a spindle in slots formed in frame arms $1^b$ attached to the frame 1.

Frictional resistance to the feed pull sufficient to keep the tape taut is produced by the pressure of a roll-spring, $4^b$, which is adjustably secured to an arm $1^b$, presses against the tape roll $4^a$ and is adjusted by a screw $4^c$. The tape 4 descends outwardly inclined to and across a marking table $M^1$ and thence substantially vertically to and between the feed rolls. This arrangement causes the tape to lie smoothly on and in contact with said marking table whatever the amount of tape on the roll, the only effect of use of tape from the roll being to increase the angle of its descent to and its pressure against the table.

Two feed rolls, 15 and $15^a$, elastically pressed together and gripping and pulling the tape 4 when they are revolved, are revolubly mounted by journals in suitable bearings in a frame $1^c$ attached to the case 1 and positively geared together by feed gears $18^b$; although they would operate satisfactorily if not so geared. The lower roll is axial with and angularly fixed relatively to the feed-gear shaft $18^a$ and revoluble therewith by the clock mechanism and the gearings 14 and 18. The diagrammed tape piles in the bottom of the case 1, whence it may be removed when desired, and new tape inserted, when the face plate 55 is removed.

I find that passing the used tape between feed rolls and letting it pile in the bottom of the case is much to be preferred to rewinding it, for a number of reasons, among them that the feed is simpler, more uniform and positively timed to and by the clock, and without variable elements; and therefore the record is much more precisely and accurately diagrammed, and the unwound tapes are easier to compare, check up with other records, and file. Removal of used and insertion of new tapes can be readily accomplished by removing the face plate 55, swinging out the marker frame M² and the parts mounted on it, lifting the clutch cone 14ʰ, turning by hand the tape-feed rolls to advance and free the last of the used tape and removing it; lifting out the empty and mounting a fresh tape roll 4ª in the slots of the frame 1ᵈ, engaging the free end of the fresh tape with the feed rolls 15 and 15ª and drawing it taut, and reëngaging the clutch 14ª and replacing the face plate 55.

In my aforesaid application I show marking apparatus comprising a marker fixed on a bar slidably mounted in guides formed in the heads of two plugs inserted into and spring-positioned in sockets bored in posts attached to the case, the bar being reciprocated with the oscillations of the vane and pointer by a hinged-lever connection with their shaft. I have improved my marking apparatus and adapted it to satisfactory use in connection with a record tape mounted and fed as set forth above. My improved marking apparatus M comprises generally, a marking table M¹ fixed to and extending transversely across the case 1 below and somewhat in advance of the anterior limb of the tape roll 4ª, so that tape drawn from said roll inclines outwardly to reach and pass across, and is drawn taut over, said table, and a unital marker frame M², located in front of the tape and marking table M¹, somewhat higher than and generally parallel with the latter and which is hinged to the case 1 at one end by a hinge M³ and detachably, preferably snap-connected thereto at the other, provided with parallel guides M⁴ for slidably mounting the marker carriage 74, and a mounting arm M⁶ on which I pivot the marker lever 60. The parallel guides M⁴ are preferably formed on the face of the frame M² and on a bar M⁵ parallel and screwed thereto at its ends and the marker carriage 74 lies between said frame and bar and engages said slides on the guides thereof. The carriage 74 carries a marker or pencil 75 and locates it exterior and perpendicular to the tape 4 and table M¹ against which it is pressed by a spring 74ª; said marker being preferably a point of pencil lead, mounted in a bore formed in a head, 74ᵇ, of the carriage 74 and fed out by said spring, which is confined in a socket 74ᶜ in said head, and between the cap, 74ᵈ, of said socket and a piston, 74ᵉ, therein, against which the pencil 75 abuts.

In my pending application the pointer and the marker move synchronously but in opposite directions, so that like legends on the tape and on the dial are on opposite sides of their common vertical axis. Practice proved this to sometimes lead to confusion and showed the desirability of always having things of like meaning in like general locations. I therefore provide a like-moving operable connection 60ª between the vane-and-pointer shaft 36 and the marker carriage so that a dip of the pointer 25 and a traverse of the carriage 74 are always synchronous and like in general direction. Said connection preferably comprises a spur pinion 260 on the shaft 26 and a lever 60 pivoted on the marker-frame arm M⁶, having its upper arm formed of a wheel segment 60ᵇ normally engaged with the pinion 260 and in its lower arm a slot 61 engaging a pin 62 projecting outwardly from the carriage 74.

When the shaft 26 is rocked by unequal air-tensions on the sides of the vane 36, it rocks the pointer 25 and lever 60 and slides the marker carriage 74 all in the same general direction, so that like readings of the tape and dial are in like general locations. When the marker frame M² is swung out, its motion causes the teeth of the wheel segment 60ᵇ to slide out of and become disengaged from those of the pinion 260, and to render access to the tape mechanism unobstructed. When the frame is swung back to its normal position the marker carriage 74 is shifted (if necessary) so that its vertical axis and pencil 75 read on the tape the same as the pointer does on the dial, and the teeth of the wheel segment slide into engagement with those of the pinion.

The operation of my marine speedometer or automatic reading and recording direction-and-speed log follows: A standard exhauster blower or reversible air pump is operably connected, by a standard gearing, with a propeller shaft or other member of the ship's engine and an air pipe system is installed connecting said pump with cases, 1, suitably located, care being taken to connect each casing with said air pipe system by means of its proper nipple and to use in each case right-hand or left-hand dials M and tapes 4, corresponding with the way it faces. The spring gages 50 of each case are next adjusted by the set-screws 52 to the air friction in the pipe between it and the pump and to the modes of action of the engines when running normal and reverse, so that all the dials will read and the tapes record similarly for the same engine-speeds. The dial A and tape 4 each have a vertical axial space corresponding with rest, the sides are respectively marked "Ahead" and "Astern" and have four course graduations adapted to indicate the major speed graduations and inscribed with corresponding legends, such as "Full speed," "Half" and "Slow," and the dial has finer speed graduations corresponding with knots, miles or it may be kilometers.

Fig. 1 illustrates a case 1 hung to face fore or starboard. As illustrated therein in full lines, the pointer and carriage stand at "rest." When the engines run they drive the air pump, which causes a current of air to flow through the air pipes and thereby moves the vane 36, pointer 25 and pencil 75. When the engines run normally, the pointer and pencil are moved to the right and register with "Ahead" and some speed graduations, as "Slow," and the pointer registers also with a fine speed graduation reading speed in knots (or other linear unit) per hour.

When the engines and air pump and the action of the latter on the vane 36 are reversed, the pointer and pencil are moved to the left, as shown in dotted lines in Fig. 1, and read "Astern," "Full" (or other) speed and the pointer shows the speed in units. The tape 4 is fed uniformly and continuously by its gear connection with the clock and the pencil 25, combining its translations with the feed of the tape 4, traces thereon a diagram which is a permanent record of the engine's performance.

Generally the air-circuits will be open, each case 1 being piped to the pump from only one socket, as 280$^r$, the other being left open, and readings ahead and astern will be caused, respectively by positive pressure and suction on the vane 36; but in dirty ships, to protect the apparatus the air circuits may be closed, the sockets 280$^r$ and 280$^s$ of each case being piped respectively to opposite sides of the air pump.

Having thus described my invention, I claim:

1. In a marine speedometer adapted to indicate and record direction and speed ahead and astern by corresponding dips of a pointer and record diagrams, a case, an air duct in said case, a movable abutment in said duct adapted to be moved by varying air-tension on opposite faces, a pointer operably connected with said movable abutment, and thereby dipped in opposite directions to indicate respectively speed ahead and astern, a record tape, tape supporting means adapted to support said tape, tape-feeding means adapted to cause a feed motion of said tape, a marker adapted to mark said tape, and marker-shifting means operably connecting said movable abutment and marker and adapted to move said marker synchronously and in the same direction with said pointer.

2. In a marine speedometer adapted to indicate and record direction and speed ahead and astern by corresponding dips of a pointer and record diagrams, a case, an air duct in said case, a closure in said duct adapted to be moved by varying air-tension on opposite faces, a pointer operably connected with said closure and thereby dipped in opposite directions to indicate respectively speed ahead and astern, a record tape, tape supporting means adapted to support said tape, tape-feeding means adapted to cause a feed motion of said tape, a marker adapted to mark said tape, and marker-shifting means operably connecting said closure and marker and adapted to move said marker synchronously and in the same direction with said pointer.

3. In a marine speedometer, comprising a case, an air duct in said case, a closure pivotally mounted in said duct, a shaft axial on said closure extending through an opening in a wall of said duct, a pointer on said shaft, a recording tape, tape-supporting means adapted to support said tape, tape-feeding means adapted to cause a feed-motion of said tape, a marker adapted to mark said tape, and a marker-support on which said marker is movably mounted, the combination therewith of operating gear connecting said shaft and marker and comprising a pinion on said shaft, a pivotally-mounted lever, a wheel-segment on one arm of said lever, and an operating connection operably connecting the other arm of said lever with said marker.

4. In a marine speedometer comprising a case, an air duct in said case, a closure pivotally mounted in said duct, a shaft axial on said closure extending through an opening in a wall of said duct, a pointer on said shaft, a recording tape, tape-supporting means adapted to support said tape, tape-feeding means adapted to cause a feed-motion of said tape, a marker-frame attached to said case, and a marker slidably mounted on said frame and adapted to mark said tape, the combination therewith of operating gear connecting said shaft and marker and comprising a pinion on said shaft, a pivotally-mounted lever, a wheel-segment on one arm of said lever, and an operating connection operably connecting the other arm of said lever with said marker.

5. In a marine speedometer comprising a case, an air duct in said case, a closure pivotally mounted in said duct, a shaft axial on said closure extending through an opening in a wall of said duct, a pointer on said shaft, a recording tape, tape-supporting means adapted to support said tape, and tape-feeding means adapted to cause a feed-motion of said tape, the combination therewith of a marker-frame hinged to said case, a marker slidably mounted on said frame and adapted to mark said tape, operating gear connecting said shaft and marker and comprising a pinion on said shaft, a pivotally-mounted lever, a wheel-segment on one arm of said lever, and an operating connection operably connecting the other arm of said lever with said marker.

6. In a marine speedometer adapted to indicate and record direction and speed ahead and astern by corresponding dips of a pointer and record diagrams, a case, an air duct in said case, a movable abutment in said duct adapted to be moved by varying air tensions on opposite faces, a pointer operably connected with said movable abutment, and thereby dipped in opposite directions to indicate respectively speed ahead and astern, a record tape, tape supporting means adapted to support said tape, a pair of tape-feeding rolls, a clock movement, a gearing, operably and releasably connecting said clock movement with said rolls, a clutch in said gearing adapted to engage and disengage members of said gearing, a marker adapted to mark said tape, a marker-support on which said marker is movably mounted, and an operable connection between said marker and said movable abutment adapted to move said marker synchronously with and in the same direction with said pointer.

7. In a marine speedometer adapted to indicate and record direction and speed ahead and astern by corresponding dips of a pointer and record diagrams, a case, an air duct in said case, a movable abutment in said duct and nearly central in said case and adapted to be moved by varying air-tensions on opposite faces, a pointer operably connected with said movable abutment, and thereby dipped in opposite directions to indicate respectively speed ahead and astern, an indicator dial adapted to be read with said pointer, a record tape, tape-supporting means adapted to support said tape, marking means operably connected with said movable abutment and adapted to be moved thereby synchronously with and in the same direction as said pointer, a pair of tape-feeding rolls, a clock movement adjacent to said indicator dial, a clock dial, a gearing operably connecting said clock movement and feed rolls and comprising a transmission shaft, a gear train operably connecting said shaft with said clock movement, a gear train operably connecting said shaft with said feed rolls, a clutch on said shaft adapted to connect and disconnect it with and from a gear, a face plate adapted to close said case and inclose therein the aforesaid elements and glazed openings in said face plate.

8. In a marine speedometer adapted to indicate and record direction and speed ahead and astern by corresponding dips of a pointer and record diagrams, a case, an air duct in said case, a movable abutment in said duct nearly central in and on the vertical axis of said case, a pointer operably connected with said movable abutment and thereby dipped in opposite directions to indicate respectively speed ahead and astern, and operable symmetrically relative to said axis, an axially located indicator dial adapted to be read with said pointer, an axially-located record tape, tape-supporting means adapted to support said tape, marking means operably connected with said movable abutment and adapted to be moved thereby synchronously with and in the same direction as said pointer, a pair of tape-feeding rolls, a clock movement adjacent to said indicator dial, a clock dial, a gearing operably connecting said clock movement and feed rolls and comprising a transmission shaft, a gear train operably connecting said shaft with said clock movement, a gear train operably connecting said shaft with said feed rolls, a clutch on said shaft adapted to connect and disconnect it with and from a gear, a face plate adapted to close said case and inclose therein the aforesaid elements and glazed openings in said plate.

9. In a marine speedometer comprising a case, an air duct, a cylindrical sector in said duct, a closure axially and pivotally mounted in said sector, a shaft axial on said closure and extending through an opening in a wall of said duct, and a pointer on said shaft, the combination therewith of a record tape mechanism comprising a tape roll revolubly mounted on said case, tape on said roll, a pair of tape feed rolls, a clock movement, a gearing operably connecting said clock mechanism with said feed rolls, a marking table on said case posterior to the traverse of said tape, a marker frame anterior to said table and to the traverse of said tape, a marker slidably mounted on said frame and operating means operably connecting said shaft with said marker and adapted to move said marker synchronously with and in the same direction as said pointer.

10. In a reversible marine speedometer comprising a case, an air duct, a cylindrical sector in said duct, a closure axially and pivotally mounted in said sector, a shaft axial on said closure and extending through an opening in a wall of said duct, a pointer on said shaft, and a record tape mechanism comprising a tape roll revolubly mounted on said case, tape on said roll, a pair of tape feed rolls, a clock movement, and a gearing operably connecting said clock mechanism with said feed rolls, the combination therewith of a marking table on said case posterior to the traverse of said tape, a marker frame anterior to said table and to the traverse of said tape and movable relatively thereto, a marker slidably mounted on said frame and co-acting marker operating members, one on said shaft and one mounted on said marker frame and operably connected with said marker, said coacting marker-operating members adapted to be engaged and disengaged by motions of said marker frame.

11. In a marine speedometer comprising a case, an air duct, a cylindrical sector in said duct, a closure axially and pivotally mounted in said sector, a shaft axial on said closure and extending through an opening in a wall of said duct, and a pointer on said shaft, the combination therewith of a record tape mechanism comprising a tape roll revolubly mounted on said case, tape on said roll, a pair of tape feed rolls, a clock movement, a gearing operably connecting said clock mechanism with said feed rolls, a marking table on said case posterior to the traverse of said tape, a marker frame anterior to said table and to the traverse of said tape, a marker slidably mounted on said frame, a marking point slidably mounted in said marker, and a spring adapted to press said point against said tape and table, and operating means operably connecting said shaft with said marker and adapted to move said marker.

CHARLES H. KENNEY.

Witnesses:
H. D. PENNEY,
JOHN MORRIS.